UNITED STATES PATENT OFFICE.

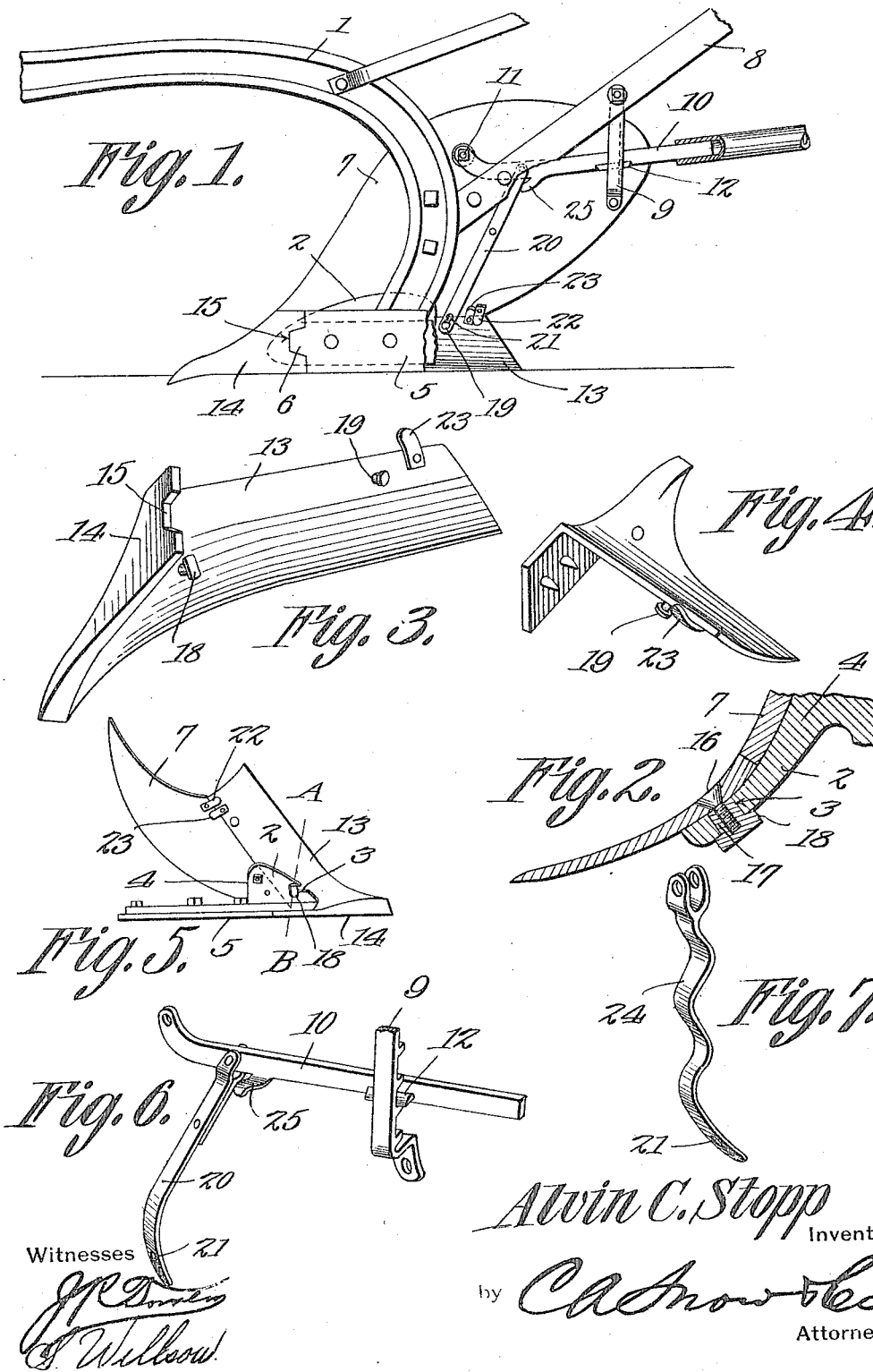

ALVIN C. STOPP, OF STOPPINGTON, ALBERTA, CANADA, ASSIGNOR OF ONE-HALF TO WILLIAM H. A. AUGER, OF FORRES, SASKATCHEWAN, CANADA.

PLOW.

1,123,618.  Specification of Letters Patent.  Patented Jan. 5, 1915.

Application filed April 6, 1914. Serial No. 829,950.

*To all whom it may concern:*

Be it known that I, ALVIN C. STOPP, a citizen of the United States, residing at Stoppington, in the Province of Alberta and Dominion of Canada, have invented a new and useful Plow, of which the following is a specification.

This invention relates to plows and more particularly to means whereby a plow share can be held in position without the use of bolts or the like and can be quickly detached without the use of wrenches or other tools such as commonly required.

A further object is to provide share holding means controlled by a single lever supported back of the upper portion of the moldboard where it will not come into contact with any of the soil and where it can be easily reached.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings: Figure 1 is a side elevation of the plow, the landside being broken away. Fig. 2 is an enlarged transverse section through a portion of the share and the frog and showing the stud for connecting the same at one side of the plow, said section being taken on the line A—B of Fig. 5. Fig. 3 is a perspective view of the share. Fig. 4 is another perspective view of the share. Fig. 5 is a bottom plan view of the plow. Fig. 6 is a detail view of the adjusting lever and adjacent parts. Fig. 7 is a detail view of a modified form of link.

Referring to the figures by characters of reference 1 designates a beam the lower or rear end of which is bolted or otherwise secured to a frog 2, there being a slot 3 extending into the frog from its lower end and one side of the frog being extended upwardly as at 4 so as to project above the share when applied to the frog. Secured to the opposite side of the frog is the landside plate 5, the front end of which is formed with a tapered lug or projection 6.

The moldboard 7 of the plow is adapted to be secured to the upwardly extending portion 4 of the frog 2 and the handles 8 are secured to the standard. Depending from one of the handles and secured at its lower end to the moldboard 7 is a rack bar 9 and a lever 10 is pivotally mounted, as at 11, upon the back face of the moldboard and extends between the rack bar 9 and the moldboard, said lever being formed with a laterally extending flange 12 adapted to be placed in engagement with any one of the teeth of the rack bar 9, thus to hold lever 10 against downward movement.

The share of the plow has been indicated at 13 and is adapted to fit snugly against the frog 2 directly under the moldboard 7 and to contact with the lower edge of the moldboard. This share has a point landside 14 in the rear end of which is formed a recess 15 adapted, when the share is fitted onto the frog 2, to receive the lug or projection 6, as shown in Fig. 1. Extending inwardly from the share 13 and close to the point is a bolt 16 on which is screwed a cylindrical nut 17 provided at its free end with a head 18. This nut is so proportioned as to slip readily into the slot 3. Another lug or projection 19 similar to that shown at 17 extends inwardly from the rear portion of the share and is detachably engaged by the laterally curved lower end portion of a link 20 pivotally connected to the lever 10 and extending downwardly therefrom. This link is preferably formed with a key-hole slot 21 for the reception of the lug or projection 19. A retaining ear 22 extends downwardly from the moldboard 7 and laps the inner face of the share 13 while another ear 23 is secured to the inner face of the share and is adapted to extend upwardly and lap the inner surface of the moldboard.

In applying the share to the plow, the same is placed so as to straddle the frog 2 and the lug 17 is slipped upwardly into the slot 3 while the recessed end of the point landside 14 is, at the same time, fitted onto the projection 6 at the front end of the landside plate 5. After the parts have thus been assembled, the link 20 is placed into engagement with the lug 19 and lever 10 is then pulled upwardly so as to cause the link 20 to pull upwardly and rearwardly on the share and bind the share tightly in place. By then shifting lever 10 laterally so as to place flange 12 in engagement with the adjacent tooth of the rack bar 9, the parts will be held together securely. By disengaging the flange 12 from the rack bar 9, the share can be quickly detached. It will be noted that the share is provided with but two projections, to wit, the lugs 17 and 19. Both of these, however, can be readily removed so that they will not interfere with the share being sharpened or dressed on an anvil.

By providing the ears 22 and 23, the rear portion of the moldboard is prevented from yielding inwardly independently of the share 13, when said moldboard is subjected to excessive resistance. The same is likewise true of the share, the same being held against inward movement independently of the moldboard.

As shown in Fig. 7, a waved spring link 24 may be used for connecting the lever 10 to the share 13, this link being in the form of a corrugated spring or being of any other shape desired whereby, when the share is subjected to excessive downward pressure, it is free to move downwardly away from the moldboard, thus oft times preventing injury to the plow such as might result should it be brought abruptly into contact with an unyielding obstruction.

As shown in Figs. 1 and 6, a tongue 25 may be extended from lever 10 close to the link 20 (or 24) so that, when lever 7 is swung downward, this tongue 25 will wedge between the link and the moldboard and thus spring the link laterally at its lower end so that it will slip off of the lug 19.

What is claimed is:—

1. In a plow, the combination with a frog, and a moldboard secured to one side thereof, there being a slot in the front portion of the moldboard side of the frog, of a share fitted under the moldboard and against the frog, a projection extending inwardly from the share and adapted to be seated in the slot in the frog, a lever fulcrumed upon the moldboard, a link connection between the lever and the share, said lever and link constituting means for binding the share upwardly against the moldboard and for holding the projection against displacement from the slotted portion of the frog, and means on the lever and coöperating with the link for automatically disengaging the link from the share during the movement of the lever to share releasing position.

2. In a plow, the combination with a frog having a slotted forward portion, and a moldboard secured to one side of the frog, of a share shiftable rearwardly into engagement with the frog and under the moldboard, a lever, a link supported by the lever and normally detachably engaging the share, said lever and link coöperating to bind the share upwardly against the moldboard and to draw the share rearwardly into engagement with the frog, and means upon the lever for deflecting the link laterally out of engagement with the share when the lever is moved in one direction.

3. In a plow, the combination with a frog, of a moldboard secured to one side thereof, a landside plate secured to the other side thereof and having a forwardly extending projection, a share having a point landside formed with a recess for the reception of the projection, said share straddling the frog, said point landside having a recess for the reception of the projection, a lever fulcrumed back of and upon the moldboard, coöperating means upon the lever and moldboard for holding said lever against downward swinging movement, a projecting member upon the share, a link pivotally connected to the lever and slidably and detachably connected to the said projecting member, means upon the lever for engaging the link during the downward movement of the lever to spring the link laterally off of the projecting member.

In testimony that I claim the foregoing as my own, I have hereto affixed my signature in the presence of two witnesses.

ALVIN C. STOPP.

Witnesses:
ANNA BLOCK,
THOS. W. NASH.

Copies of this patent may be obtained for five cents each, by addressing the "Commissioner of Patents, Washington, D. C."